US012807209B2

(12) United States Patent
Odate

(10) Patent No.: US 12,807,209 B2
(45) Date of Patent: Nov. 24, 2026

(54) STEERING APPARATUS

(71) Applicant: Honda Motor Co., Ltd., Tokyo (JP)

(72) Inventor: Shotaro Odate, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 18/943,443

(22) Filed: Nov. 11, 2024

(65) Prior Publication Data

US 2025/0162642 A1 May 22, 2025

(30) Foreign Application Priority Data

Nov. 17, 2023 (JP) ................................. 2023-195695

(51) Int. Cl.
*B62D 1/06* (2006.01)
*G01D 5/24* (2006.01)

(52) U.S. Cl.
CPC .................................... *B62D 1/06* (2013.01); *G01D 5/24* (2013.01)

(58) Field of Classification Search
CPC . B62D 1/06; B62D 1/046; B62D 1/04; G01D 5/24; B60W 40/09; B60W 2420/24
See application file for complete search history.

(56) References Cited

U.S. PATENT DOCUMENTS

2005/0052426 A1* 3/2005 Hagermoser .......... B60K 35/10 345/173
2014/0277896 A1* 9/2014 Lathrop ................. B60K 35/10 74/484 R
2015/0369633 A1* 12/2015 Karasawa ................ B62D 1/04 324/686

FOREIGN PATENT DOCUMENTS

JP 2013235313 A 11/2013
JP 2015053123 A 3/2015
JP 2023104298 A 7/2023
WO WO-2020195620 A1 * 10/2020 ........... H03K 17/962

OTHER PUBLICATIONS

English translation of WO-2020195620-A1 (Year: 2020).*
Japanese Office action; Application 2023-195695; 8 pages; Jun. 10, 2025.

* cited by examiner

*Primary Examiner* — Alvaro E Fortich
*Assistant Examiner* — Haidong Zhang
(74) *Attorney, Agent, or Firm* — Duft & Bornsen, PC

(57) ABSTRACT

A steering apparatus includes: a steering wheel, and a sensor unit configured to detect contact or close proximity of a human body to the steering wheel. The sensor unit includes: a plurality of electrodes provided in the steering wheel, and a plurality of correction electrodes each disposed on a face of a corresponding electrode among the plurality of electrodes, for correcting a capacitance value derived from the corresponding electrode.

7 Claims, 5 Drawing Sheets

STEERING APPARATUS

CROSS-REFERENCE TO RELATED APPLICATION

This application is based upon and claims the benefit of priority from Japanese Patent Application No. 2023-195695 filed on Nov. 17, 2023, the content of which is incorporated herein by reference.

BACKGROUND

Technical Field

The present invention relates to a steering apparatus configured to detect whether a steering wheel is gripped by an occupant.

Related Art

In a device that determines presence or absence of a touch, by using a touch sensor of an electrostatic capacitance type, a technique for providing a dummy sensor of an electrostatic capacitance type in the vicinity of the touch sensor is known (see, for example, JP 2015-53123 A). By determining the presence or absence of a touch, based on detected values of the touch sensor and the dummy sensor, unintended contact and erroneous detection caused by an external radio wave noise are prevented.

However, in the conventional technique, erroneous detection is likely to occur due to a difference in installation environment between the touch sensor and the dummy sensor. For example, in some cases, the electrostatic capacitance fluctuates depending on the temperature, and easily causes a problem particularly in an in-vehicle environment in which the temperature easily changes.

The present invention suppresses an influence caused by a difference in installation environment between a touch sensor and a dummy sensor, and appropriately detects a driver's grip on a steering wheel, thereby leading to an improvement in traffic safety. This enables a contribution to development of a sustainable transportation system.

SUMMARY

An aspect of the present invention is a steering apparatus includes: a steering wheel; and a sensor unit configured to detect contact or close proximity of a human body to the steering wheel. The sensor unit includes: a plurality of electrodes provided in the steering wheel; and a plurality of correction electrodes each disposed on a face of a corresponding electrode among the plurality of electrodes, for correcting a capacitance value derived from the corresponding electrode.

BRIEF DESCRIPTION OF DRAWINGS

The objects, features, and advantages of the present invention will become clearer from the following description of embodiments in relation to the attached drawings, in which.

DETAILED DESCRIPTION OF THE INVENTION

Hereinafter, embodiments of the invention will be described with reference to the drawings.

<System Configuration>

Figure 1:
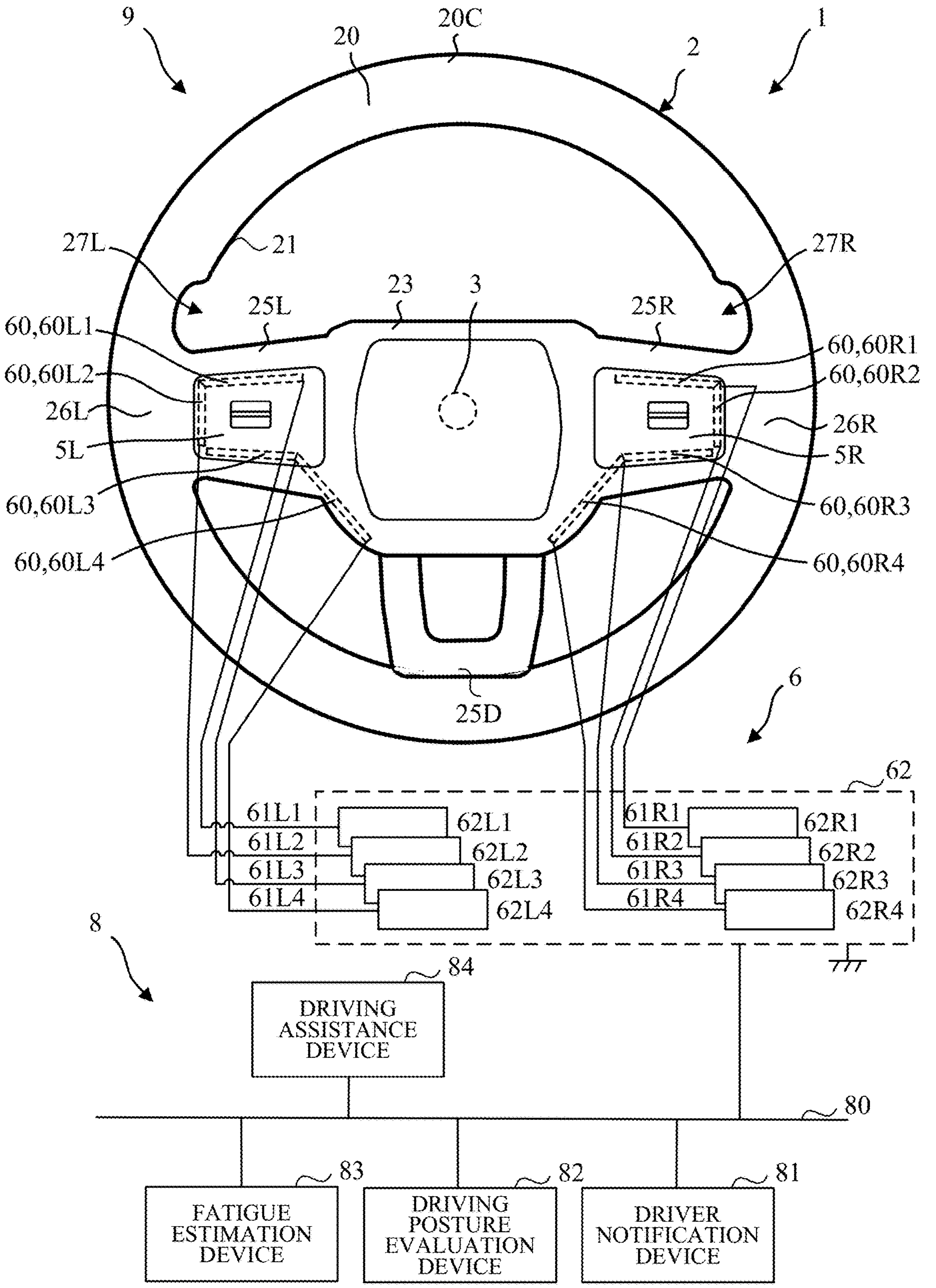
FIG. 1 is a diagram illustrating a configuration of a steering apparatus according to an embodiment and a safe driving assistance system, which includes the steering apparatus.

FIG. 1 is a diagram illustrating a configuration of a steering apparatus 1 according to an embodiment and a safe driving assistance system 9, which includes such a steering apparatus 1.

The safe driving assistance system 9 includes: the steering apparatus 1, which is mounted on a vehicle, not illustrated; and a control device group 8, which is communicably connected with the steering apparatus 1. The safe driving assistance system 9 supports driver's safe driving of the vehicle, by using the steering apparatus 1 and the control device group 8.

In an embodiment, each of devices 81 to 84, which constitute the control device group 8, will be described as an in-vehicle device capable of communicating with the steering apparatus 1 on, for example, CAN communication via a controller area network (CAN) bus 80. However, all or some of the plurality of devices 81 to 84, which constitute the control device group 8, may be configured as a device that is outside the vehicle and that is capable of wirelessly communicating with the steering apparatus 1 via an in-vehicle communication device, not illustrated.

<Outline of Steering Apparatus>

The steering apparatus 1 includes: a steering wheel 2, which receives a steering operation by a driver for a vehicle, an auxiliary machine operation for an auxiliary machine of the vehicle, and the like; a steering shaft 3, which pivotally supports the steering wheel 2; and a grip detection device 6 that detects a driver's grip on the steering wheel 2. The auxiliary machine operation and the like include operations for a navigation device, an audio device, an air conditioner, a multi-information display, and the like, and an operation for a driving assistance apparatus. The driving assistance apparatus includes, for example, a lane keep assistant system (LKAS) and an adaptive cruise control (ACC).

The steering wheel 2 includes: for example, a rim portion 20, which has an annular shape, and which the driver is able to grip; a hub portion 23, which is provided on an inner side of the rim portion 20; and three spoke portions 25L, 25R, and 25D, each of which extends from the hub portion 23 along a radial direction, and is connected with a rim inner circumferential portion 21 of the rim portion 20.

The hub portion 23 has a disk shape, and is provided, for example, at the center of the rim portion 20, when viewed from the driver's seat, and constitutes the center of the steering wheel 2. The steering shaft 3, which pivotally supports the steering wheel 2, is coupled with the back surface of the hub portion 23, when viewed from the driver's seat. The steering shaft 3 serves as a coupling member that has a shaft shape and that couples a core metal, which is a skeleton of the hub portion 23, with a steering mechanism, which constitutes a part of a vehicle body, not illustrated.

Therefore, steering torque generated by the driver rotating the steering wheel 2 is transmitted by the steering shaft 3 to the steering mechanism.

The rim portion 20 and the hub portion 23 are connected with each other by the three spoke portions 25L, 25R, and 25D. The left spoke portion 25L extends along a horizontal direction, and connects a part on the left side of the hub portion 23 in a front view from the driver's seat with a left spoke connection portion 26L, which is a part on the left side of the rim inner circumferential portion 21 in the front view from the driver's seat. The right spoke portion 25R extends in parallel with the left spoke portion 25L and along the horizontal direction, and connects a part on the right side of the hub portion 23 in the front view from the driver's seat with a right spoke connection portion 26R, which is a part on the right side of the rim inner circumferential portion 21 in the front view from the driver's seat. The lower spoke portion 25D extends along a direction orthogonal and perpendicular to each of the spoke portions 25L and 25R, and connects a part on a lower side of the hub portion 23 in the front view from the driver's seat with a part on a lower side of the rim inner circumferential portion 21 in the front view from the driver's seat.

As illustrated in FIG. 1, in a part, of the rim inner circumferential portion 21, that is connected with an upper portion of the left spoke connection portion 26L in the front view from the driver's seat, a left thumb fit portion 27L, which is concave radially outward is formed in the front view from the driver's seat. In addition, in a part, of the rim inner circumferential portion 21, that is connected with an upper portion of the right spoke connection portion 26R in the front view from the driver's seat, a right thumb fit portion 27R, which is concave radially outward is formed in the front view from the driver's seat.

In the steering apparatus 1 according to an embodiment, a posture in which the thumb of the left hand is fit to the left thumb fit portion 27L and the base of the thumb of the left hand is brought into contact with the left spoke connection portion 26L and the remaining fingers of the left hand grip the rim portion 20 is regarded as a recommended grip posture for the driver's left hand. Therefore, a recommended grip position for the driver's left hand is set to a part including the left spoke connection portion 26L in the rim portion 20.

Further, in the steering apparatus 1 according to an embodiment, a posture in which the thumb of the right hand is fit to the right thumb fit portion 27R and the base of the thumb of the right hand is brought into contact with the right spoke connection portion 26R and the remaining fingers of the right hand grip the rim portion 20 is regarded as a recommended grip posture for the driver's right hand. Therefore, the recommended grip position for the driver's right hand is set to a part including the right spoke connection portion 26R in the rim portion 20.

The left spoke portion 25L and the right spoke portion 25R are respectively provided with a left auxiliary machine operation console unit 5L and a right auxiliary machine operation console unit 5R, each of which receive an auxiliary machine operation for the driver to operate a vehicle auxiliary machine, not illustrated, or the like. The left auxiliary machine operation console unit 5L and the right auxiliary machine operation console unit 5R each have a substantially rectangular shape when viewed from the driver. By operating a plurality of switches provided in the left auxiliary machine operation console unit 5L and the right auxiliary machine operation console unit 5R with fingers, the driver is able to operate the vehicle auxiliary machines and the like.

The left auxiliary machine operation console unit 5L and the right auxiliary machine operation console unit 5R may be respectively referred to as a left function switch unit and a right function switch unit.

In addition, in the following description, the positions of the rim portion 20, which is substantially circular when viewed from the driver, the rim inner circumferential portion 21, the hub portion 23, and the steering shaft 3, and the directions of the respective spoke portions 25L, 25R, and 25D will be represented in some cases by clockwise angles (deg) centered on the steering shaft 3 and based on the position of an upper end portion 20C of the rim portion 20 in the front view from the driver's seat. That is, the right spoke portion 25R extends along a direction of 90 deg, and connects the hub portion 23 with a part of 90 deg of the rim inner circumferential portion 21. The lower spoke portion 25D extends along a direction of 180 deg, and connects the hub portion 23 with a part of 180 deg of the rim inner circumferential portion 21. In addition, the left spoke portion 25L extends along a direction of 270 deg, and connects the hub portion 23 with a part of 270 deg of the rim inner circumferential portion 21. When expressed by the clockwise angle (deg), the recommended grip position for the driver's left hand is set to a position of 270 deg of the rim portion 20. Further, the recommended grip position for the driver's right hand is set to a position of 90 deg of the rim portion 20.

<Grip Detection Device>

As an example, the grip detection device 6 includes an electrode 60, which is provided in the steering wheel 2, and a sensor unit 62, which is electrically connected with the electrode 60. In the following, eight electrodes including a first left electrode 60L1, a second left electrode 60L2, a third left electrode 60L3, and a fourth left electrode 60L4, a first right electrode 60R1, a second right electrode 60R2, a third right electrode 60R3, and a fourth right electrode 60R4 will be collectively referred to as the electrode 60, in some cases.

The eight electrodes configuring the electrode 60 are each formed in a plate shape with electric conductivity. The first left electrode 60L1, the second left electrode 60L2, the third left electrode 60L3, and the fourth left electrode 60L4 are provided in the vicinity of the recommended grip position for the left hand set to the rim portion 20 in the steering wheel 2. More specifically, the first left electrode 60L1 and the second left electrode 60L2 are each provided along a side wall face in an upper part and on a radially outer side of the left auxiliary machine operation console unit 5L in the left spoke portion 25L when viewed from the driver (more specifically, on an end face of a printed wiring board (may also be referred to as an electronic board), not illustrated, disposed inside the left auxiliary machine operation console unit 5L).

In addition, the third left electrode 60L3 and the fourth left electrode 60L4 are each provided along a face that faces the rim portion 20 in a lower part of the left auxiliary machine operation console unit 5L (more specifically, on an end face of the above printed wiring board) in the left spoke portion 25L and in a left lower part of the hub portion 23 when viewed from the driver.

Similarly, the first right electrode 60R1, the second right electrode 60R2, the third right electrode 60R3, and the fourth right electrode 60R4 are provided in the vicinity of the recommended grip position for the right hand set to the rim portion 20 in the steering wheel 2. More specifically, the first right electrode 60R1 and the second right electrode 60R2 are each provided along a side wall face in an upper part and on a radially outer side of the right auxiliary machine operation console unit 5R in the right spoke portion 25R when viewed from the driver (more specifically, on an end face of a printed wiring board disposed inside the right auxiliary machine operation console unit 5R).

In addition, the third right electrode 60R3 and the fourth right electrode 60R4 are each provided along a face that faces the rim portion 20 in a lower part of the right auxiliary machine operation console unit 5R (more specifically, on an end face of the above printed wiring board) in the right spoke portion 25R and in a right lower part of the hub portion 23 when viewed from the driver.

Among the above eight electrodes, the first left electrode 60L1, the second left electrode 60L2, the third left electrode 60L3, and the fourth left electrode 60L4 may be integrally formed on a base substrate while being insulated from one another. Similarly, the first right electrode 60R1, the second right electrode 60R2, the third right electrode 60R3, and the fourth right electrode 60R4 may be integrally formed on the base substrate while being insulated from one another.

<Sensor Unit>

The sensor unit 62 includes eight sensor units 62L1, 62L2, 62L3, 62L4, 62R1, 62R2, 62R3, and 62R4, which respectively correspond to the eight electrodes 60L1, 60L2, 60L3, 60L4, 60R1, 60R2, 60R3, and 60R4. The sensor unit 62L1 is connected with the first left electrode 60L1 through left wiring 61L1. The sensor unit 62L2 is connected with the second left electrode 60L2 through left wiring 61L2. The sensor unit 62L3 is connected with the third left electrode 60L3 through left wiring 61L3. The sensor unit 62L4 is connected with the fourth left electrode 60L4 through left wiring 61L4.

In addition, the sensor unit 62R1 is connected with the first right electrode 60R1 through right wiring 61R1. The sensor unit 62R2 is connected with the second right electrode 60R2 through right wiring 61R2. The sensor unit 62R3 is connected with the third right electrode 60R3 through right wiring 61R3. the sensor unit 62R4 is connected with the fourth right electrode 60R4 through right wiring 61R4.

The sensor units 62L1 to 62L4 are, for example, provided inside the left spoke portion 25L, together with the above-described left auxiliary machine operation console unit 5L. The sensor units 62R1 to 62R4 are provided inside the right spoke portion 25R, together with the above-described right auxiliary machine operation console unit 5R.

<Grip Detection Range>

Figure 2:
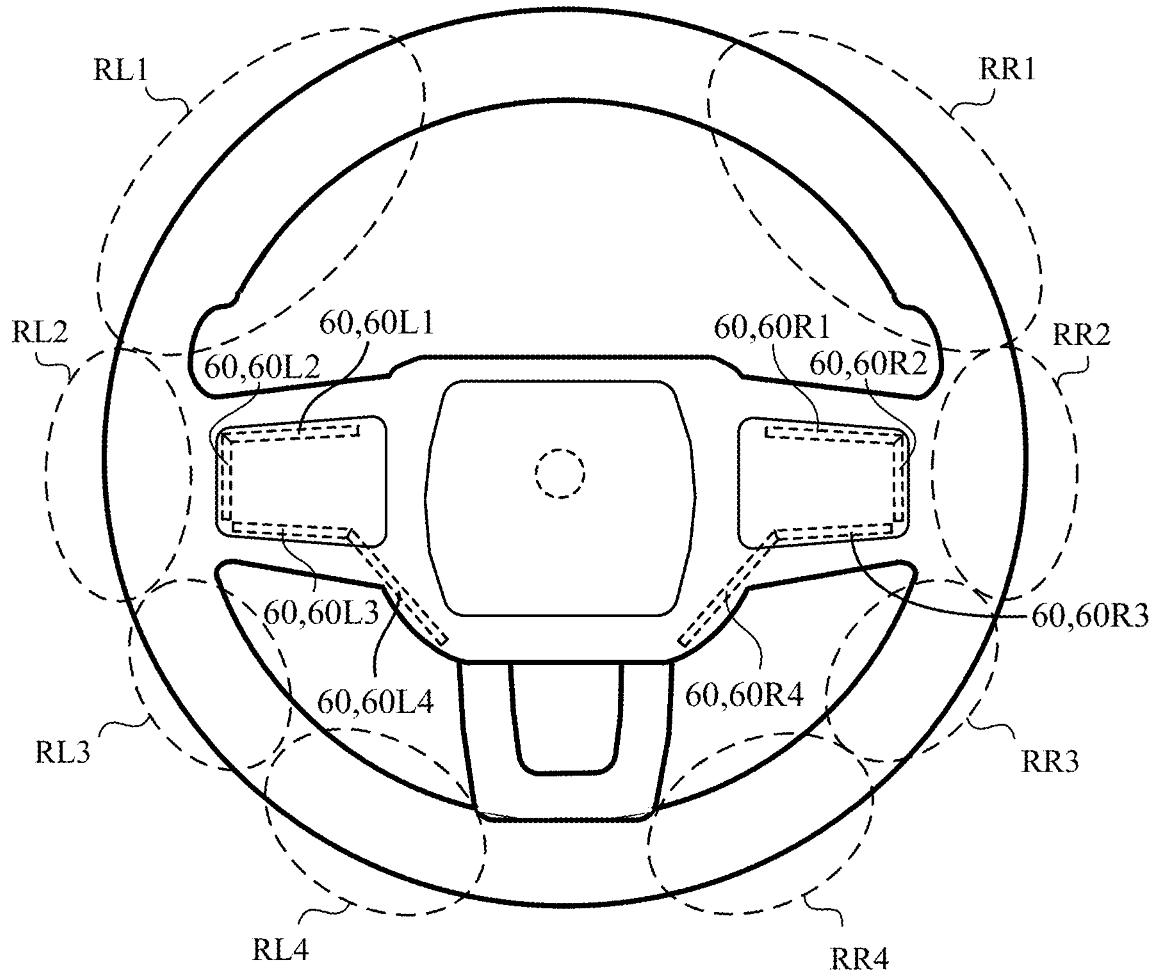
FIG. 2 is a schematic diagram illustrating grip detection ranges by electrodes.

FIG. 2 is a schematic diagram illustrating grip detection ranges RL1 to RL4, and RR1 to RR4 by the electrode 60 (60L1 to 60L4, and 60R1 to 60R4) as described above. When a predetermined voltage is applied to the corresponding electrodes 60L1 to 60L4, and 60R1 to 60R4 in the respective grip detection ranges RL1 to RL4, and RR1 to RR4, lines of electric force are induced from these electrodes 60L1 to 60L4, and 60R1 to 60R4.

In an embodiment, as described above, the first left electrode 60L1 and the second left electrode 60L2 are provided in the left spoke portion 25L in the vicinity of the recommended grip position (270 deg) of the rim portion 20 for the left hand, and the third left electrode 60L3 and the fourth left electrode 60L4 are provided in the hub portion 23 in the vicinity of the recommended grip position (270 deg to 180 deg) of the rim portion 20 for the left hand.

With such a configuration, the grip detection ranges RL1 and RL2 (330 deg to 260 deg) correspond to the first left electrode 60L1 and the second left electrode 60L2, and the grip detection ranges RL3 and RL4 (260 deg to 210 deg) correspond to the third left electrode 60L3 and the fourth left electrode 60L4.

Similarly, the first right electrode 60R1 and the second right electrode 60R2 are provided in the right spoke portion 25R in the vicinity of the recommended grip position (90 deg) of the rim portion 20 for the right hand, and the third right electrode 60R3 and the fourth right electrode 60R4 are provided in the hub portion 23 in the vicinity of the recommended grip position (90 deg to 180 deg) of the rim portion 20 for the right hand.

With such a configuration, the grip detection ranges RR1 and RR2 (30 deg to 100 deg) correspond to the first right electrode 60R 1 and the second right electrode 60R2, and the grip detection ranges RR3 and RR4 (100 deg to 150 deg) correspond to the third right electrode 60R3 and the fourth right electrode 60R4.

<Circuit Configuration Example>

Figure 3:
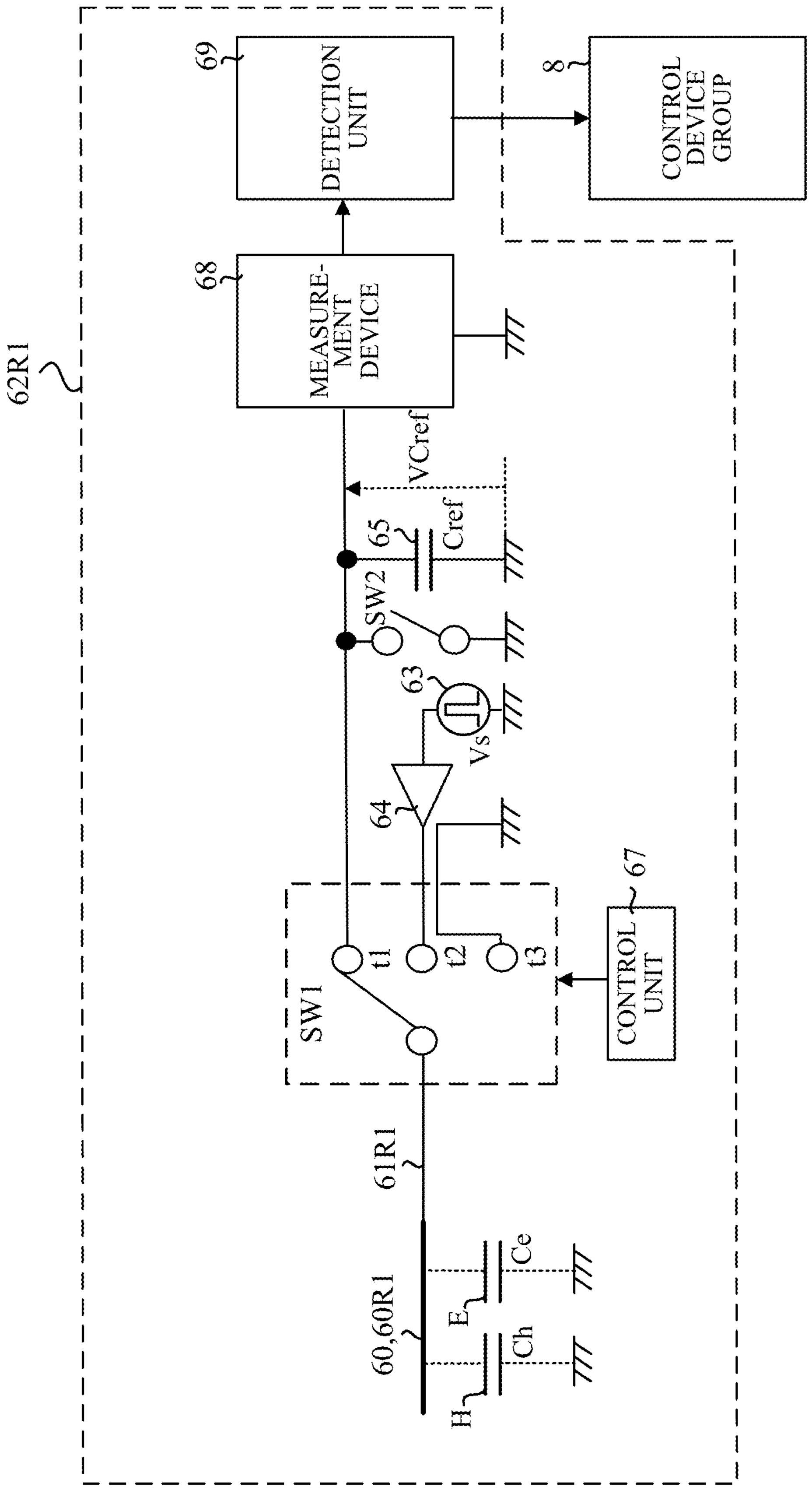
FIG. 3 is a diagram illustrating a circuit configuration of a sensor unit.

FIG. 3 is a diagram illustrating a circuit configuration of the sensor unit 62R1 in the grip detection device 6. Although not illustrated, the same configuration also applies to the circuit configurations of the sensor units 62L 1 to 62L4, and 62R2 to 62R4 except for the sensor unit 62R1.

The sensor unit 62R1 measures an electric property of the first right electrode 60R1 (for example, electrostatic capacitance between the first right electrode 60R1 and the ground (for example, the vehicle body)), detects the driver's grip on the steering wheel 2, based on a measurement result, and further estimates the driver's grip position in the rim portion 20.

The sensor unit 62R1 includes a first switch SW1, a pulse power source 63, an amplifier 64, a control unit 67, a second switch SW2, a charging capacitor 65, a measurement unit 68, and a detection unit 69, and detects the driver's grip on the steering wheel 2 by using them.

Note that in FIG. 3, the electrostatic capacitance between the first right electrode 60R 1 and the ground is illustrated to be divided into electrostatic capacitance Ch, which is formed by a human body H including a hand of the driver who operates the steering wheel 2, and stray capacitance Ce, which is formed by a stray capacitor E such as wiring or a component part excluding the human body H.

As illustrated in FIG. 3, the pulse power source 63 and the amplifier 64 are connected in series with each other. In addition, the second switch SW2 and the charging capacitor 65 are connected in parallel with each other. A series circuit including the pulse power source 63 and the amplifier 64 and a parallel circuit including the second switch SW2 and the charging capacitor 65 are connected with each other through the first switch SW1. More specifically, an output terminal of the amplifier 64 and the first right electrode 60R1 are connected with each other through the first switch SW1 and the right wiring 61R1. Further, the second switch SW2 and the charging capacitor 65 are connected with the first right electrode 60R1 through the first switch SW1 and the right wiring 61R1.

In response to, for example, a command from the control unit 67, the pulse power source 63 supplies the amplifier 64 with a pulse voltage Vs having a predetermined frequency and a predetermined voltage. The amplifier 64 amplifies the pulse voltage Vs, which is supplied from the pulse power source 63, and applies the amplified pulse voltage to the first right electrode 60R 1 through the first switch SW1 and the right wiring 61R1.

The second switch SW2 is, for example, a switching element such as a transistor to be turned on/off by a drive circuit, not illustrated, in the control unit 67. As an example, until a voltage VCref of the charging capacitor 65 reaches a predetermined voltage threshold Vthr, the control unit 67 turns off the second switch SW2 to accumulate electric charge in the charging capacitor 65 (may also be referred to as charging). After the voltage VCref reaches the threshold Vthr, the control unit 67 further turns on the second switch SW2, and discharges the electric charge accumulated in the charging capacitor 65.

The first switch SW1 is, for example, a switching element, switching of which is controlled by a drive circuit, not illustrated, in the control unit 67, and is configured with a field effect transistor (FET) or the like as an example. In an embodiment, a terminal t1 for connecting the first right electrode 60R1 with the charging capacitor 65, a terminal t2 for connecting the first right electrode 60R1 with the amplifier 64, and a terminal t3 for connecting the first right electrode 60R1 with the ground line are included.

The ground line is equipotential to a GND pattern of a printed circuit board (PCB) on which circuits excluding the first right electrode 60R1 of the circuits of the sensor unit 62R1 are formed, and is provided substantially in parallel with at least one of a wiring pattern to the above terminal t1 and a wiring pattern to the above terminal t2. In FIG. 3, the ground line is illustrated in parallel with the wiring pattern to the terminal t2.

The ground line (GND pattern) disposed near a signal line (the wiring pattern to the terminal t2) enables strengthening of electromagnetic coupling between the signal line and the ground line, and enables suppression of coupling between the signal line and any other pattern on the PCB. In other words, a signal of another pattern on the PCB being transmitted as noise to the signal line due to a leakage current or the like that flows on the surface of the PCB is suppressed, and in reverse, a signal of the signal line being transmitted as noise to any other pattern on the PCB is suppressed.

According to a command from the control unit 67, the first switch SW1 selects the terminal t1 of the first switch SW1 in accordance with a rise of the pulse voltage Vs of the pulse power source 63. This connects the first right electrode 60R1 with the amplifier 64 through the first switch SW1 and the right wiring 61R1, applies the pulse voltage supplied from the pulse power source 63 and the amplifier 64 to the first right electrode 60R1, and charges the human body H and the stray capacitor E.

Subsequently, according to a command from the control unit 67, the first switch SW1 selects the terminal t2 of the first switch SW1 in accordance with a fall of the pulse voltage Vs of the pulse power source 63. This connects the first right electrode 60R1 with the charging capacitor 65 through the first switch SW1 and the right wiring 61R1, moves the electric charge that has been charged in the human body H and the stray capacitor E to the charging capacitor 65, and charges the charging capacitor 65. Accordingly, the voltage VCref of the charging capacitor 65 increases.

In this manner, when the pulse voltage is repeatedly applied to the first right electrode 60R1 by the pulse power source 63 and the amplifier 64, charging and discharging of the human body H and the stray capacitor E are alternately repeated, and the voltage VCref of the charging capacitor 65 gradually increases. In this situation, the time until the voltage VCref of the charging capacitor 65 reaches the predetermined voltage threshold Vthr (may be represented by the number of pulses of the pulse power source 63) changes in accordance with the electrostatic capacitance Ch, which is formed by the human body H, that is, a relative position to the first right electrode 60R1 of a hand of the driver who operates the steering wheel 2. That is, in a case where the driver's hand grips a part in the rim portion 20 within the grip detection range RR1 (see FIG. 2) and the electrostatic capacitance Ch increases, the time taken for the voltage VCref of the charging capacitor 65 to reach the threshold Vthr decreases. In a case where the driver's hand is apart from the grip detection range RR1 and the electrostatic capacitance Ch decreases, the time taken for the voltage VCref of the charging capacitor 65 to reach the voltage threshold Vthr increases.

Furthermore, according to a command from the control unit 67, the first switch SW1 selects the terminal t3 of the first switch SW1 at a predetermined timing. This connects the first right electrode 60R1 with the ground line through the first switch SW1 and the right wiring 61R1, and discharges the electric charge that has been charged on the human body H and in the stray capacitor E and the electric charge that remains in the first right electrode 60R 1 and the right wiring 61R1 to the ground line.

In a case of selecting, for example, the terminal t1 of the above-described first switch SW1 and in a case of selecting the terminal t2 of the first switch SW1, the control unit 67 outputs a command to the first switch SW1 to select the terminal t3 temporarily, and then to select the terminal t1 and the terminal t2.

In addition, the control unit 67 may output a command to the first switch SW1 to select the terminal t3 of the first switch SW1 so as to match the timing of turning on the second switch SW2 (in other words, to discharge the electric charge stored in the charging capacitor 65).

Furthermore, a command may be output to the first switch SW1 to select the terminal t3 of the first switch SW1 so as to match the timing when another auxiliary machine operates.

The timing of selecting the terminal t3 of the first switch SW1 is configured to be appropriately changeable by a program executed by the control unit 67.

The measurement unit 68 measures the electrostatic capacitance Ch, which is formed by the human body H. More specifically, the measurement unit 68 includes detector (not illustrated), which detects the voltage VCref of the charging capacitor 65, and measures the time and the number of pulses until the voltage VCref reaches the threshold Vthr based on detection values of the detector. Based on a result of the measurement, the measurement unit 68 indirectly measures the electrostatic capacitance Ch, which is formed by the human body H that is present in the vicinity of the first left electrode 60L1. The measurement unit 68 outputs a measured value Ch_d of the electrostatic capacitance Ch that has been obtained in the above procedure to the detection unit 69.

The detection unit 69 detects the driver's grip on the rim portion 20, based on the electrostatic capacitance measured value Ch_d by the measurement unit 68, and also estimates the grip position in the rim portion 20, upon detection of the grip on the rim portion 20. The detection unit 69 estimates that a position (for example, 100 deg) closer to the right spoke portion 25R in the rim portion 20 is gripped, as the value of the electrostatic capacitance measured value Ch_d increases when the grip is detected, and estimates that a position (for example, 150 deg) farther from the right spoke portion 25R in the rim portion 20 is gripped, as the value of the electrostatic capacitance measured value Ch_d decreases when the grip is detected.

As described heretofore, the detection unit 69 of the sensor unit 62R 1 detects the driver's grip in the grip detection range RL1 of the rim portion 20, based on the measured value Ch_d of the electrostatic capacitance Ch, which is formed by the human body H that is present in the vicinity of the first right electrode 60R1, and estimates the grip position on the rim portion 20.

Note that although the description is omitted, the detection of the grip and the estimation of the grip position in the grip detection range RR2 of the rim portion 20 by the sensor unit 62R2, the detection of the grip and the estimation of the grip position in the grip detection range RR3 of the rim portion 20 by the sensor unit 62R3, and the detection of the grip and the estimation of the grip position in the grip detection range RR4 of the rim portion 20 by the sensor unit 62R4 are also similar to the detection of the grip and the estimation of the grip position in the grip detection range RR1 of the rim portion 20 by the sensor unit 62R1 described above.

In addition, the detection of the grip and the estimation of the grip position in the grip detection ranges RL1 to RL4 of the rim portion 20 by the sensor units 62L1 to 62L4 are also similar to the detection of the grip and the estimation of the grip position in the grip detection range RR1 of the rim portion 20 by the sensor unit 62R1 described above.

<Details of Electrostatic Capacitance Measurement>

Details of measurement of the electrostatic capacitance Ch will be further described. The above-described sensor unit 62R1 detects the electrostatic capacitance, based on the voltage VCref of the charging capacitor 65, which has been charged with the electric charge from the human body H and the stray capacitor E. Therefore, a measured value of the electrostatic capacitance (in the following description, will be referred to as a capacitance value, in some cases) that is measured by the sensor unit 62R1 includes both the electrostatic capacitance Ch of the human body H and the stray capacitance Ce of the stray capacitor E.

The measurement unit 68 performs the following processing in order to exclude a value corresponding to the stray capacitance Ce from the measured capacitance value (in other words, to extract the electrostatic capacitance Ch). In the following description, the value corresponding to the stray capacitance Ce will be referred to as a capacitance-based value.

The sensor unit 62R1 is usually controlled to measure a capacitance value n every predetermined time (for example, 10 msec). The measurement unit 68 calculates the latest capacitance-based value n with use of the following Equation (1), based on the capacitance value n, which has been measured in a state in which the steering wheel 2 is not gripped by the driver.

Equation (1)

$$\text{Capacitance-based value } n = (\text{capacitance value } n + WT + \text{capacitance-based value } (n-1)) / (WT+1) \quad (1)$$

However, the capacitance value n denotes a capacitance value that has been measured by the sensor unit 62R1. In a state in which the steering wheel 2 is not gripped by the driver, the capacitance value n indicates the value corresponding to the stray capacitance Ce. The symbol WT indicates a predetermined weight value. The capacitance-based value (n−1) indicates a capacitance-based value that has been calculated with use of Equation (1) in the calculation of previous time (10 msec ago).

According to the above Equation (1), weighted calculation is made with use of the latest capacitance value n and the weighted capacitance-based value of the previous time (n−1). Therefore, in a case where the latest capacitance value n changes from the previous value in accordance with a change in the installation environment of the electrode, it becomes possible to calculate the latest capacitance-based value n so as not to change greatly from the capacitance-based value of the previous time (n−1).

The measurement unit 68 calculates the latest capacitance differential value n with use of the following Equation (2), whenever the capacitance value n is measured and the capacitance-based value n is calculated at intervals of the above predetermined time.

Equation (2)

$$\text{Capacitance differential value } n = \text{capacitance value } n - \text{capacitance-based value } n \quad (2)$$

However, the capacitance value n indicates the most recent capacitance value that has been measured by the sensor unit 62R1. The capacitance-based value n indicates the most recent capacitance-based value that has been calculated with use of the above Equation (1).

In a case where the most recent capacitance differential value n, which has been calculated with use of the above Equation (2), is smaller than a predetermined determination threshold, the measurement unit 68 determines that the steering wheel 2 is not gripped by the driver, and repeats measurement of the capacitance value n, calculation of the capacitance-based value n, and calculation of the capacitance differential value n with use of the above Equation (2) every predetermined time described above.

In a case where the most recent capacitance differential value n, which has been calculated with use of the above Equation (2), exceeds the predetermined determination threshold, the measurement unit 68 determines that there is a possibility that the steering wheel 2 is gripped by the driver, and stops the calculation of the capacitance-based value. Then, the measurement of the capacitance value n and the calculation of the capacitance differential value n with use of the following Equation (3) are repeated every predetermined time described above.

Equation (3)

$$\text{Capacitance differential value } n = \text{capacitance value } n - \text{capacitance-based value } p \quad (3)$$

However, the capacitance value n indicates the most recent capacitance value that has been measured by the sensor unit 62R1. In a state in which the steering wheel 2 is gripped by the driver, the capacitance value n indicates a value including both the electrostatic capacitance Ch of the human body H and the stray capacitance Ce of the stray capacitor E. The capacitance-based value p indicates a past capacitance-based value that was calculated last time with use of the above Equation (1).

In a case where the most recent capacitance differential value n, which has been calculated with use of the above Equation (3), is smaller than the predetermined determination threshold, the measurement unit 68 determines that the steering wheel 2 is not gripped by the driver, and resumes the calculation of the capacitance-based value n.

Then, the measurement of the capacitance value n, the calculation of the capacitance-based value n, and the calculation of the capacitance differential value n with use of the above Equation (2) are repeated every predetermined time described above.

The measurement unit 68 transmits the capacitance differential value n, which has been calculated with use of the above Equation (2) or the above Equation (3), to the detection unit 69, as the measured value Ch_d of the electrostatic capacitance Ch.

<Countermeasures Against Fluctuation of Measured Value>

In an embodiment, for example, in the case of the sensor unit 62R1, the voltage VCref of the above charging capacitor 65 fluctuates depending on the installation environment (in particular temperature and humidity) of the first right electrode 60R1. Specifically, the stray capacitance Ce of the stray capacitor E changes in accordance with an environmental change such as temperature, and thus the voltage VCref of the charging capacitor 65 fluctuates. The fluctuation of the voltage VCref also affects the measured value Ch_d of the electrostatic capacitance Ch.

In order to suppress the influence on the measured value Ch_d of the electrostatic capacitance Ch due to the temperature or the like, the measurement unit 68 corrects the capacitance-based value p of the above Equation (3), and calculates the capacitance differential value n, as follows.

Figure 4A:
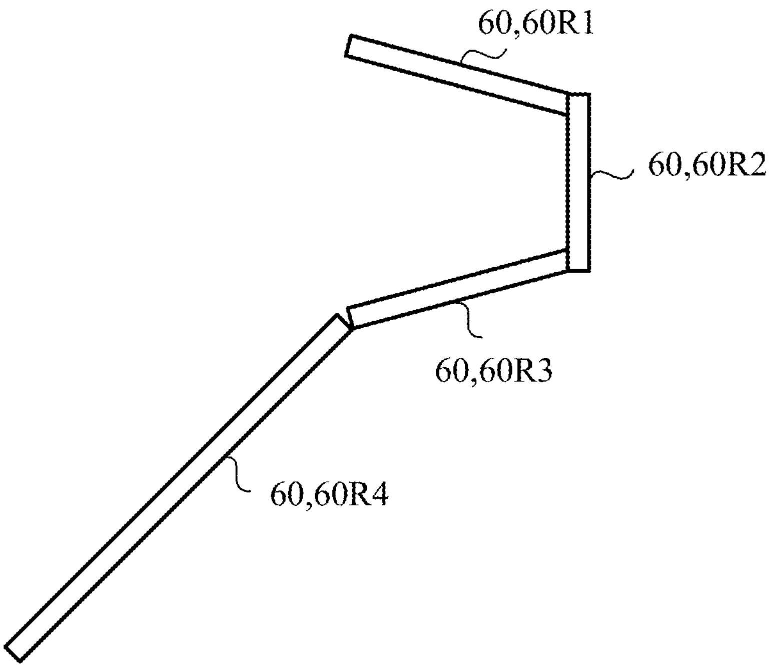
FIG. 4A is a schematic diagram in which the right electrodes in FIG. 1 are selected.

FIG. 4A is a schematic diagram in which the first right electrode 60R1, the second right electrode 60R2, the third right electrode 60R3, and the fourth right electrode 60R4 are selected from the eight electrodes 60L1, 60L2, 60L3, 60L4, 60R1, 60R2, 60R3, and 60R4 in FIG. 1.

The four electrodes 60R1, 60R2, 60R3, and 60R4 are provided along a side wall face in an upper part and on a radially outer side of the right auxiliary machine operation console unit 5R in the right spoke portion 25R and along a face that faces the rim portion 20 in a lower part of the right auxiliary machine operation console unit 5R and in a right lower part of the hub portion 23 when viewed from the driver.

Figure 4B:
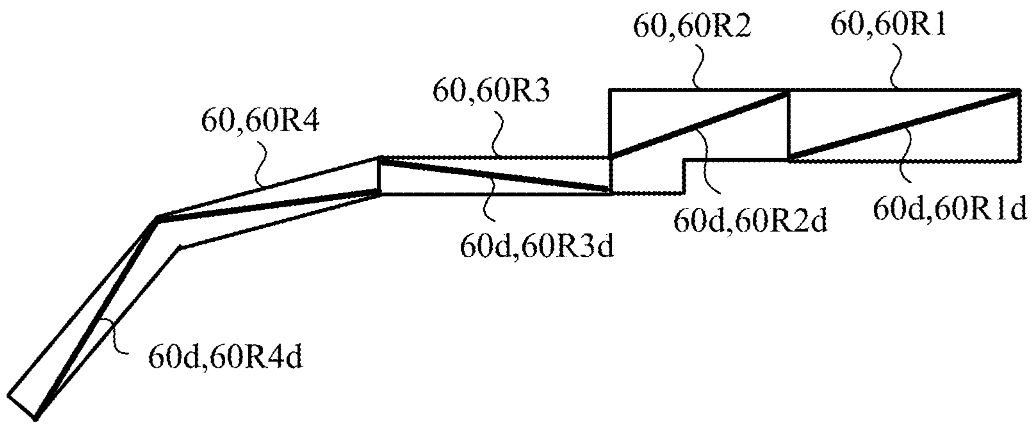
FIG. 4B is a schematic diagram showing the electrodes in FIG. 4 in an expanded view.

FIG. 4B is a schematic diagram showing the four electrodes 60R1, 60R2, 60R3, and 60R4 illustrated in FIG. 4A in an expanded view. In each of the electrodes 60R1, 60R2, 60R3, and 60R4, dummy electrodes 60R1*d*, 60R2*d*, 60R3*d*, and 60R4*d*, each of which has a plate shape with conductivity, are disposed along a plate-shaped electrode surface with conductivity while being respectively insulated from the electrodes 60R1, 60R2, 60R3, and 60R4. More specifically, when viewed with the longitudinal direction of each electrode considered as a lateral direction, the respective dummy electrodes 60R 1*d*, 60R2*d*, 60R3*d*, and 60R4*d* are disposed in directions that traverse the surfaces of the respective electrodes 60R1, 60R2, 60R3, and 60R4.

The dummy electrode 60R1*d*, 60R2*d*, 60R3*d*, and 60R4*d* have smaller surface areas than those of the corresponding four electrodes 60R1, 60R2, 60R3, and 60R4 (for example, 1/100 in each case). For this reason, it is difficult to measure the capacitance value based on the electric charge that has been charged on the human body H, by using the dummy electrodes. However, it is possible to grasp the tendency that the capacitance value (corresponding to the above capacitance-based value n) based on the electric charge that has been charged in the stray capacitor E fluctuates depending on the installation environment of the dummy electrode.

For example, the first right electrode 60R1 and the dummy electrode 60R1*d*, which corresponds to the first right electrode 60R1, are regarded as being in the same installation environment. Then, in a case where the capacitance value corresponding to the stray capacitance Ce, which is measured, based on the electric charge that has been moved from the first right electrode 60R1, fluctuates depending on the installation environment, it is estimated that the capacitance value corresponding to the stray capacitance Ce, which is measured, based on the electric charge that has been moved from the corresponding dummy electrode 60R1*d*, also fluctuates depending on the installation environment.

The most recent capacitance differential value n, which is calculated with use of the above Equation (2), exceeds the predetermined determination threshold. After the calculation of the capacitance-based value n is stopped, in a case where the measurement of the capacitance value n and the calculation of the capacitance differential value n with use of the above Equation (3) are repeated at intervals of the above predetermined time, the measurement unit 68 repeats the measurement of the capacitance value (referred to as a dummy capacitance value dn) based on the electric charge that has been moved from the dummy electrode every predetermined time described above in parallel with the measurement of the capacitance value n.

Then, in a case where the dummy capacitance value dn fluctuates (in a case where there is a change by equal to or larger than a predetermined value from the measured value of the previous time (10 msec ago)), the capacitance-based value p is corrected with use of a correction value $\Delta\times\alpha$, which is obtained by multiplying a variation width (fluctuation range) $\Delta$ by a predetermined coefficient $\alpha$ (corresponding to a surface area ratio between the dummy electrode and the corresponding electrode, and is 100 in the above example). For example, in a case where there is an increase from the measured value of the previous time, the capacitance differential value n is calculated in the above Equation (3) with use of a corrected capacitance-based value $(p+\Delta\times\alpha)$, which is obtained by adding the correction value $\Delta\times\alpha$ to the capacitance-based value p of the previous time. On the other hand, in a case where there is a decrease from the measured value of the previous time, the capacitance differential value n is calculated in the above Equation (3) with use of a corrected capacitance-based value $(p-\Delta\times\alpha)$, which is obtained by subtracting the correction value $\Delta\times\alpha$ from the capacitance-based value p of the previous time.

This enables appropriate calculation of the capacitance differential value n (that is, the electrostatic capacitance Ch of the human body H) with use of the corrected capacitance-based value $(p\pm\Delta\times\alpha)$ that has been corrected, based on a fluctuation range of the dummy capacitance value dn, even though the stray capacitance Ce of the stray capacitor E changes in accordance with an environmental change such as temperature, while the calculation of the capacitance-based value n is stopped.

In the description heretofore, the sensor unit 62R1 has been described as a representative example of the eight sensor units 62L1 to 62L4 and 62R1 to 62R4. However, the same configuration also applies to the measurement of the electrostatic capacitance Ch using any one of the other sensor units 62R2 to 62R4 and 62L 1 to 62L4. However, the weighted value WT in the above Equation (1) and a value of the predetermined threshold for determination to be compared with the capacitance differential value n, which is calculated in the above Equations (2) and (3), may be appropriately changed for every sensor unit.

<Main Configuration of Controller>

Figure 5:
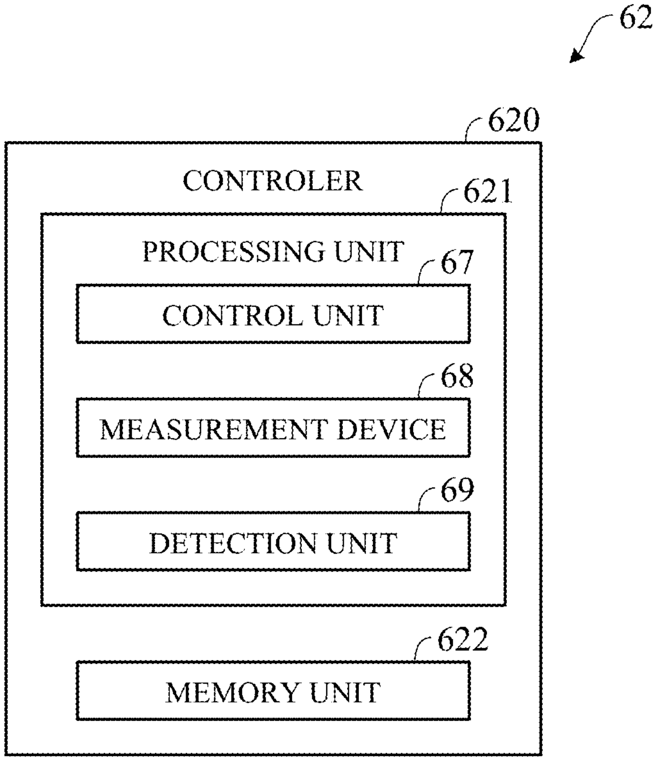
FIG. 5 is a diagram illustrating a configuration of a substantial part of a controller included in the sensor unit.

FIG. 5 is a diagram illustrating a configuration of a substantial part of a controller 620, which is included in the sensor unit 62, which includes the sensor units 62L1, 62L2, 62L3, 62L4, 62R1, 62R2, 62R3, and 62R4. As illustrated in FIG. 5, the controller 620 includes a computer including a processing unit such as a CPU (microprocessor) and a storage unit 622 such as a ROM and a RAM. By executing a program stored in the storage unit 622, the processing unit 621 functions as the control unit 67, the measurement unit 68 (which does not include the above detector), and the detection unit 69 in FIG. 3. That is, the processing unit 621 includes the control unit 67, the measurement unit 68, and the detection unit 69 in FIG. 3 as a functional configuration. Note that the processing unit 621 may include the control unit 67, the measurement unit 68, and the detection unit 69 individually for each of the sensor units 62L1, 62L2, 62L3, 62L4, 62R1, 62R2, 62R3, and 62R4, or may include the control unit 67, the measurement unit 68, and the detection unit 69 commonly for them.

According to the above-described embodiments, the following effects are obtainable.

(1) The steering apparatus 1 includes: the steering wheel 2; and the sensor unit 62, which detects contact or close proximity of a human body to the steering wheel 2. The sensor unit 62R1 includes: the plurality of electrodes 60 (for example, 60R1 to 60R4), which are provided in the steering wheel 2; and the dummy electrodes 60*d* (for example, 60R1*d* to 60R4*d*) as a plurality of electrodes for correction (may also be referred to as correction electrodes) disposed on the faces of the respective electrodes 60R1 to 60R4 to correct the capacitance value based on each of the electrodes 60R1 to 60R4.

With such a configuration, it becomes possible to appropriately detect the grip on the steering wheel 2. Specifically, the respective dummy electrodes 60R1*d* to 60R4*d* can be regarded as being in substantially the same installation environment as the respective electrodes 60R1 to 60R4. Thus, in a case where the capacitance value based on each of the electrodes 60R 1 to 60R4 changes due to temperature or the like, it becomes possible to correct the capacitance value based on each of the electrodes 60R1 to 60R4, based on a change in the capacitance value of each of the dummy electrodes 60R1*d* to 60R4*d*. This enables detection of the grip on the steering wheel 2 to correspond to the property of each of the sensor units 62, each of which includes the electrodes 60R1 to 60R4.

(2) In the steering apparatus 1, the dummy electrodes 60R1*d* to 60R4*d* are respectively disposed in the longitudinal direction along the faces of the electrodes 60R1 to 60R4.

With such a configuration, it becomes possible to dispose longer dummy electrodes 60R1*d* to 60R4*d* along the faces of the respective electrodes 60R1 to 60R4. This enables installation of the respective dummy electrodes 60R1*d* to 60R4*d* to be regarded as in substantially the same installation environment as the respective electrodes 60R1 to 60R4, thereby enabling the detection of the grip on the steering wheel 2 to correspond to the property of each sensor unit 62 including the electrodes 60R1 to 60R4.

(3) In the steering apparatus 1, the respective dummy electrodes 60R1*d* to 60R4*d* are configured linearly along the faces of the respective electrodes 60R1 to 60R4.

With such a configuration, the areas of the respective dummy electrodes 60R1*d* to 60R4*d* can be kept small (for example, 1/100 as described above). This enables installation of the respective dummy electrodes 60R1*d* to 60R4*d* to suppress the influence on the respective electrodes 60R1 to 60R4. In addition, by configuring the respective dummy electrodes 60R 1*d* to 60R4*d* so that the areas of the respective dummy electrodes 60R 1*d* to 60R4*d* decrease, that is, so that it is difficult to measure the capacitance value based on the electric charge that has been charged on the human body, it becomes possible for the dummy electrodes 60R1*d* to 60R4 to accurately detect the fluctuation caused by the installation environment of the capacitance value (corresponding to the above capacitance-based value n) based on the electric charge that has been charged in the stray capacitor E. By correcting the capacitance value based on the respective electrodes 60R1 to 60R4, based on a change in the capacitance values of the respective dummy electrodes 60R1*d* to 60R4*d*, which are configured in this manner, the grip on the steering wheel 2 can be accurately detected, even in a case where the stray capacitance Ce of the stray capacitor E changes in accordance with an environmental change such as temperature.

(4) In the steering apparatus 1, the steering wheel 2 includes: the rim portion 20 having an annular shape; the hub portion 23, which is provided on an inner side of the rim portion 20; and the spoke portions 25L, 25R, and 25D, which extend from the hub portion 23 in the radial direction of the rim portion 20, and which connect the hub portion 23 with the inner circumferential portion 21 of the rim portion 20. For example, the sensor unit 62R1 is disposed in the right auxiliary machine operation console unit (right function switch unit) 5R, which is disposed on the right spoke portion 25R.

In general, it is easy to ensure the space in the spoke portion to be broader than the space in the rim portion. Therefore, with a configuration of the above (4), it becomes possible to enhance the production performance, as compared with a case where the sensor unit is insert-molded in the rim portion of the steering wheel.

(5) In the steering apparatus 1, the plurality of spoke portions 25L, 25R, and 25D are provided between the rim portion 20 to be gripped by an occupant and the hub portion 23. For example, the sensor units 62L1 to 62L4, and the sensor units 62R1 to 62R4 are respectively disposed on the left spoke portion 25L and the right spoke portion 25R in a front view from the driver's seat out of the plurality of spoke portions 25L, 25R, and 25D, and are also disposed in close proximity to a switch or the like as a component part for performing at least one operation of a vehicle information operation or a driving support function operation in the left auxiliary machine operation console unit (left function switch unit) 5L and the right auxiliary machine operation console unit (right function switch unit) 5R.

With such a configuration, the PCBs of the sensor units 62L1 to 62L4, and the sensor units 62R1 to 62R4 are respectively disposed on the left auxiliary machine operation console unit (left function switch unit) 5L and the right auxiliary machine operation console unit (right function switch unit) 5R, which are disposed as a pair in the left and right spoke portions 25L and 25R, so that the grip in the left and right recommended grip ranges of the rim portion 20 can be appropriately detected.

The above embodiment can be modified into various forms. Hereinafter, modifications will be described.

(First Modification)

In an embodiment, the annular steering wheel has been exemplified as the steering wheel 2. However, the present invention may also be applied to a case where a non-annular steering wheel having an irregular shape such as a quadrangular shape or a rod shape is used.

(Second Modification)

In an embodiment, eight electrodes including the first left electrode 60L1 to the fourth left electrode 60L4, and the first right electrode 60R1 to the fourth right electrode 60R4 have been exemplified as the plurality of electrodes 60. However, the number of electrodes may be larger or smaller than the eight exemplified electrodes.

In addition, the eight sensor units 62L1 to 62L4, and 62R1 to 62R4 have been exemplified respectively corresponding to the eight exemplified electrodes 60L 1 to 60L4, and 60R1 to 60R4. However, the number of sensor units 62 may be increased or decreased in accordance with the number of electrodes 60.

Further, in an embodiment, the case where one electrode 60 corresponds to one sensor unit 62 has been exemplified. However, a plurality of electrodes 60 may correspond to one sensor unit 62. For example, one sensor unit 62, which is disposed in the left spoke portion 25L in a front view, corresponds to the first left electrode 60L1 to the fourth left electrode 60L4, and in addition, another sensor unit 62, which is disposed in the right spoke portion 25R in the front view, corresponds to the first right electrode 60R 1 to the fourth right electrode 60R4.

Furthermore, the left and right sensor units 62 may be integrated into one. In the case of integration, one integrated sensor unit 62 may be disposed in any of the left spoke portion 25L, the right spoke portion 25R, and the lower spoke portion 25D.

(Third Modification)

In an embodiment, the measurement unit 68 as a correction unit respectively corrects the capacitance values based on the electrode 60R1 to 60R4, based on a fluctuation range of the capacitance value based on the dummy electrodes 60R1*d* to 60R4*d*, which are disposed on the faces of the electrodes 60R1 to 60R4. However, in the steering apparatus 1, in addition to the plurality of dummy electrodes 60R1*d* to 60R4*d*, the sensor unit 62 may further configure the measurement unit 68 as the correction unit to use an electrode in which no electric charge is accumulated due to contact or close proximity to the human body among the plurality of electrodes 60R1 to 60R4, which are provided in the steering wheel 2, in order to correct the capacitance value based on another electrode in which the electric charge is accumulated. That is, among the electrodes 60R1 to 60R4, the correction unit may correct the capacitance value based on the electrode in which the electric charge is accumulated, based on the fluctuation range of the capacitance value based on the electrode in which no electric charge is accumulated due to contact or close proximity to the human body.

With such a configuration, among the electrodes 60R1 to 60R4, the electrode in which no electric charge is accumulated due to contact or close proximity to the human body can be used, instead of the dummy electrodes 60R1*d* to 60R4*d*. This enables enhancement of redundancy in the grip detection of the steering wheel 2.

(Fourth Modification)

A thermistor element may be provided, instead of each of the dummy electrodes 60R1*d* to 60R4*d*. As a specific example, four thermistor elements are disposed along the plate-shaped electrode faces of the electrodes 60R1, 60R2, 60R3, and 60R4 illustrated in FIG. 4B while being respectively insulated from the electrodes 60R1, 60R2, 60R3, and 60R4.

The measurement unit 68 detects the environmental temperature of each of the electrodes 60R1, 60R2, 60R3, and 60R4, based on a resistance value of each thermistor, and selects a correction coefficient to be used for correction from a plurality of correction coefficients prepared beforehand, based on a detected temperature. Then, the capacitance differential value n is calculated in the above Equation (3) with use of a corrected capacitance-based value (p±correction coefficient).

According to the fourth modification described above, while the calculation of the capacitance-based value n is stopped, even though the stray capacitance Ce of the stray capacitor E changes in accordance with an environmental change such as temperature, the capacitance differential value n (that is, the electrostatic capacitance Ch of the human body H) can be appropriately calculated with use of the corrected capacitance-based value (p±correction coefficient) that has been corrected with a correction coefficient to be selected, based on a change in the resistance value of the thermistor element.

The above embodiment can be combined as desired with one or more of the above modifications. The modifications can also be combined with one another.

According to the present invention, it becomes possible to appropriately detect the grip on the steering wheel.

Above, while the present invention has been described with reference to the preferred embodiments thereof, it will be understood, by those skilled in the art, that various changes and modifications may be made thereto without departing from the scope of the appended claims.

What is claimed is:

1. A steering apparatus comprising:

a steering wheel; and a sensor unit configured to detect contact of a human body with the steering wheel, wherein the sensor unit comprises-a microprocessor, wherein:

a microprocessor;

a plurality of electrodes provided in the steering wheel; and a plurality of correction electrodes each disposed on a face of a corresponding electrode among the plurality of electrodes, for correcting a capacitance value derived from the corresponding electrode, and the microprocessor is configured to perform:

calculating a correction value of each of the plurality of electrodes based on a fluctuation range of a capacitance value derived from the corresponding correction electrode among the plurality of correction electrodes; and correcting the capacitance value derived from a corresponding electrode among the plurality of electrodes by using the correction value of the corresponding electrode.

2. The steering apparatus according to claim 1, wherein the plurality of correction electrodes are each disposed in a longitudinal direction along the face of the corresponding electrode among the plurality of electrodes.

3. The steering apparatus according to claim 1, wherein the plurality of correction electrodes are each configured linearly along the face of the corresponding electrode among the plurality of electrodes.

4. The steering apparatus according to claim 1, wherein the correction value is a value obtained by multiplying the fluctuation range of the capacitance value derived from the corresponding correction electrode by a predetermined coefficient, and the predetermined coefficient is derived for each of the plurality of electrodes, based on a surface area ratio between an electrode and a corresponding correction electrode to the electrode.

5. The steering apparatus according to claim 1, wherein the steering wheel comprises:

a rim portion having an annular shape;

a hub portion provided on an inner side of the rim portion; and a spoke portion extending from the hub portion in a radial direction of the rim portion and connecting the hub portion with an inner circumferential portion of the rim portion, and the sensor unit is disposed in a function switch unit disposed on the spoke portion.

6. The steering apparatus according to claim 5, wherein the spoke portion is provided on a left side and a right side in a front view from a driver seat between the rim portion to be gripped by an occupant and the hub portion, and the sensor unit is disposed on the spoke portion on the left side and the spoke portion on the right side.

7. The steering apparatus according to claim 1, wherein the microprocessor is configured to perform the correcting including correcting the capacitance value derived from an electrode in which an electric charge is accumulated among the plurality of electrodes, based on the fluctuation range of the capacitance value derived from an electrode in which no electric charge is accumulated due to contact of the human body among the plurality of electrodes.

* * * * *